March 17, 1953 W. S. PATTERSON ET AL 2,631,932
SYNTHESIS GAS GENERATOR AND WASTE HEAT BOILER
Filed Aug. 8, 1947 2 SHEETS—SHEET 1

INVENTORS
W. S. Patterson
W. N. Armacost
by
ATTORNEYS.

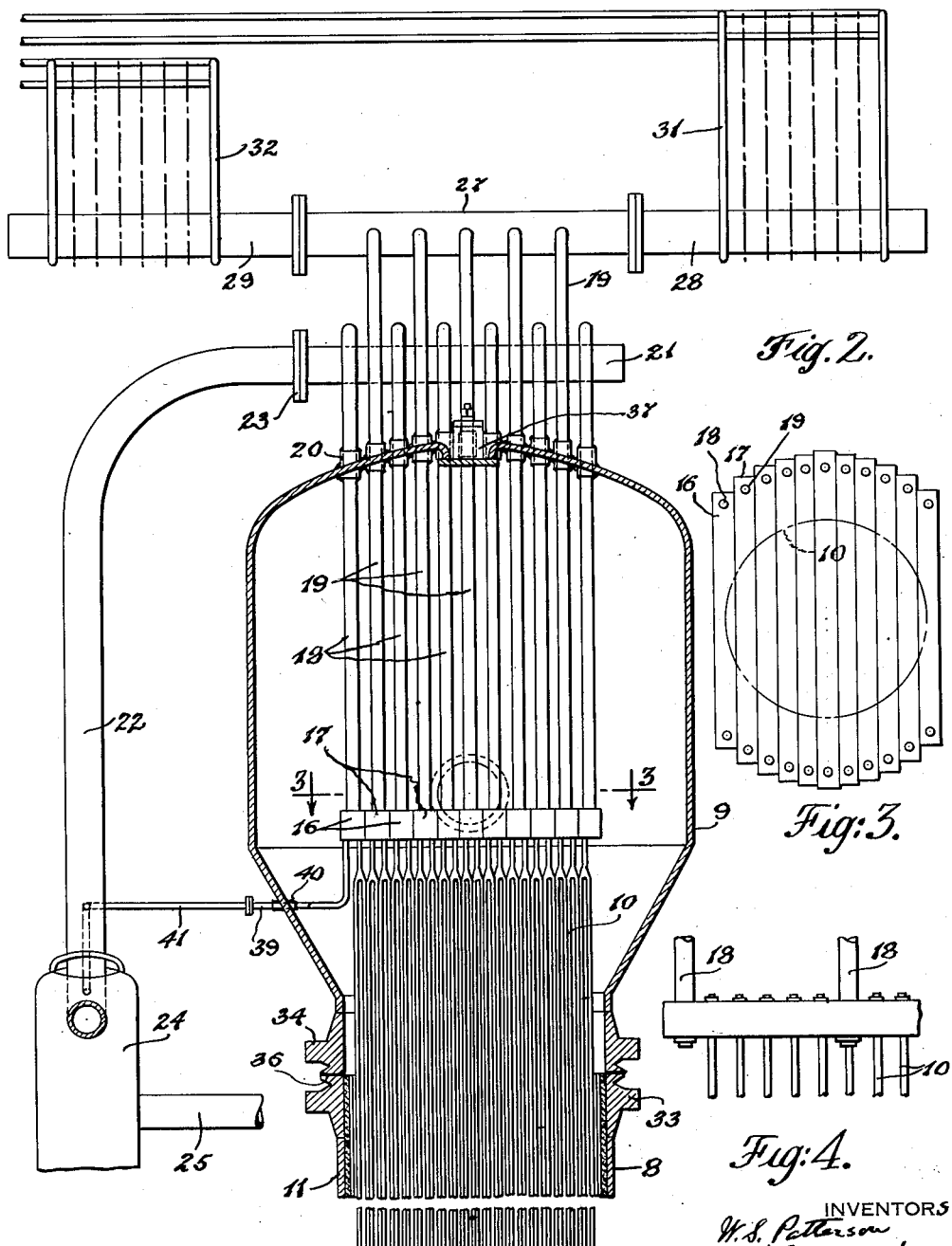

Patented Mar. 17, 1953

2,631,932

UNITED STATES PATENT OFFICE 2,631,932

SYNTHESIS GAS GENERATOR AND WASTE HEAT BOILER

Ward S. Patterson, Chappaqua, and Wilbur H. Armacost, Scarsdale, N. Y., assignors to Combustion Engineering-Superheater, Inc., a corporation of Delaware Application August 8, 1947, Serial No. 767,550

11 Claims. (Cl. 48—196)

This invention relates to the art of converting natural gas into other fuel gases, such as ethane, and high octane gasoline components, such as octene, and by products such as ethyl alcohol and fuel such as diesel oil. The first step in the processing of the natural gas is to burn the gas in a furnace or so-called gas generator, under a reducing atmosphere, to convert the gas, which is very largely methane, into carbon monoxide and hydrogen, these being subsequently rearranged by catalysis in a so-called synthesis reactor into the desired end products.

Since this process requires a very large amount of steam for operating auxiliary equipment and the like, the gas generator has associated therewith a waste heat boiler.

In copending application of Ward S. Patterson, Serial No. 763,343, filed July 24, 1947, there is illustrated a gas generator and waste heat boiler suitable for high capacity operation. As will further appear, the generator, in the main, comprises a furnace section, a cooling section, and a gas collecting dome, the cooling section being provided with a bundle of steam generator boiler tubes functioning to cool the gases generated in the furnace section. The invention shown and described herein is also shown and described in copending application of Ward S. Patterson, Serial No. 34,678, filed June 23, 1948, now Patent No. 2,603,559, issued July 15, 1952.

This invention particularly has to do with the arrangement of the dome and the bundle and parts directly associated therewith, in such manner that the same may be fabricated in the shop as a unit and shipped as such, or assembled on the ground as a unit for assembly with and disassembly from the balance of the equipment, as a unit.

Other objects and advantages will appear hereinafter.

How the foregoing, together with such other objects and advantages as may hereinafter appear or are incident to the invention, are realized is illustrated in the accompanying drawings, wherein—

Fig. 2 is a diagrammatic front elevation in partial section of the upper part of the apparatus shown in Fig. 1, drawn on an enlarged scale to more clearly illustrate certain of the parts;

Fig. 3 is a section taken on the line 3—3 of Fig. 2 drawn on a somewhat smaller scale; and Fig. 4 is a view illustrating details of the invention.

Figure 1:
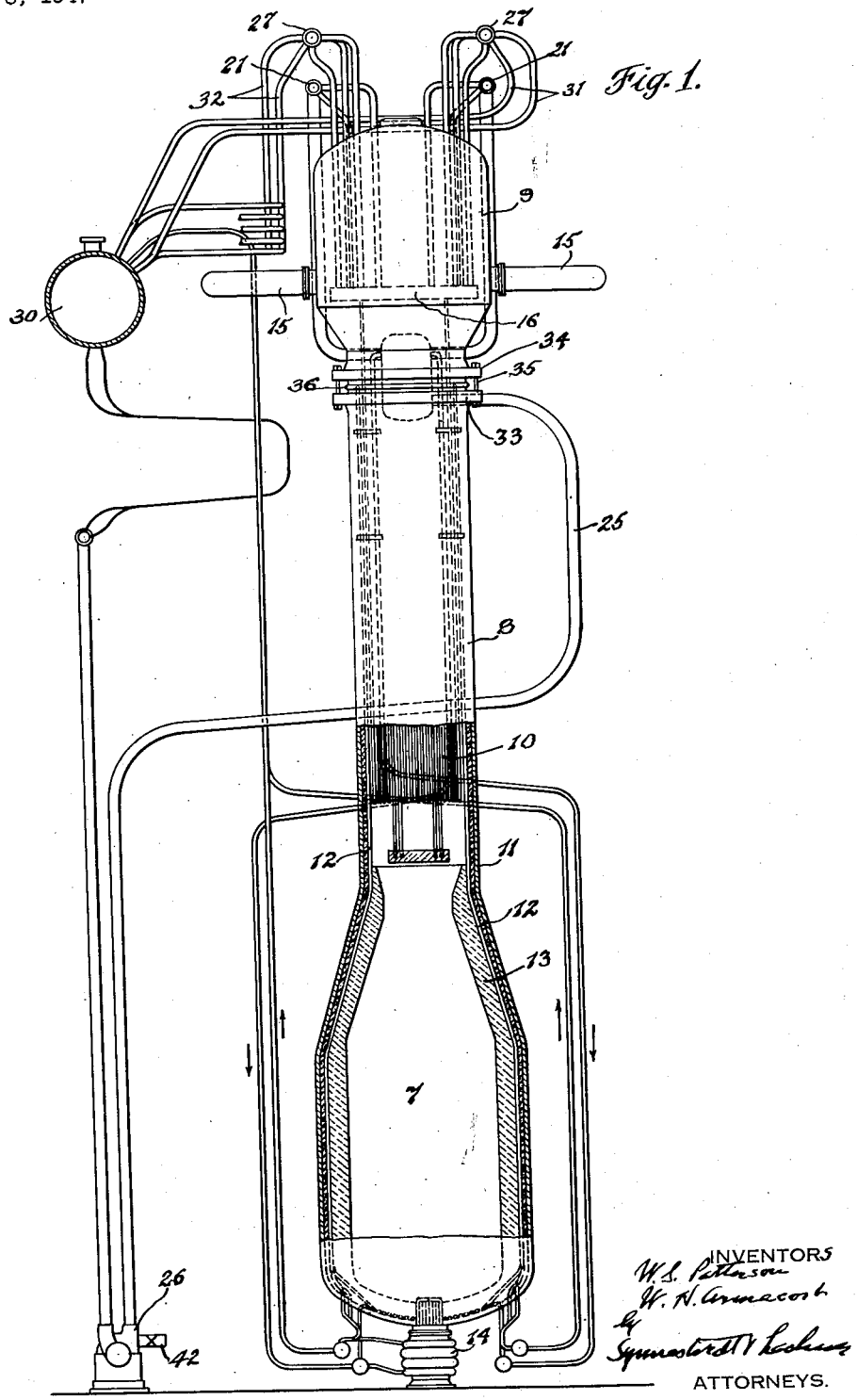
Fig. 1 is a diagrammatic side elevation and partial section of a gas generator and waste heat boiler embodying our invention.

Referring now to Fig. 1, the reference numeral 7 indicates the furnace section, the reference numeral 8 the gas cooling section, the reference numeral 9 the gas collecting dome; and the reference numeral 10 the bundle of cooling tubes filling the gas cooling section. The furnace section, cooling section and dome are preferably vertically serially arranged and communicate the one with the other. The dome is composed of sections welded together.

A casing 11 is provided for the furnace section and the gas cooling section, this casing being preferably of welded drum construction, the sections of which are welded together to provide a gas-tight, pressure tight casing. This casing, from bottom to top, is lined with a continuous tubular water wall 12 connected into the circulation of the boiler, by which the casing is protected from high temperature gases and cooled. The furnace section is lined with a refractory lining 13.

Natural gas preheated to high temperature, usually about 1200° F., is delivered into the bottom of the furnace through the water cooled burner 14 under high pressure, usually of the order of about 285 to about 300 p. s. i. An oxidant, such as oxygen, is also delivered to the burner for mixture with the natural gas, in an amount sufficient to maintain only a reducing atmosphere. This oxygen is also preheated, usually to about 600° F., and is also under high pressure, from about 265 to about 300 p. s. i.

In the furnace, which operates at a temperature of about 2500° F., the methane is converted into carbon monoxide and hydrogen.

The gases leaving the furnace are cooled in the cooling section by the water walls and by the bundle of tubes 10, eventually discharging into the dome 9 at a temperature of about 600° F. (In the installation shown in the drawings the bundle has about 10,000 square feet of surface.) From the dome the cooled gases are eventually led to the synthesis reactor not shown, by means of the pipes 15 which are detachably connected to the dome 9 as shown.

Referring now to Figs. 1 and 2, the manner in which the bundle of cooling tubes 10, and associated parts, are associated with the dome will now be described.

Within the dome are a plurality of inlet or feeder or supply (inlet) headers 16 alternating with discharge or outlet (delivery) headers 17. These headers are arranged side by side, horizontally as shown, and will hereinafter be termed downcomer and upcomer headers. The headers are respectively supported or suspended by supply or feeder or downcomer tubes 18, the lower ends of which are connected into the inlet headers 16, and by the discharge or delivery or upcomer tubes 19, the lower ends of which are connected into the upcomer headers 17. The downcomer tubes 18 and the upcomer tubes 19 pass through the wall of the dome. Where they pass through such wall, sleeves 20 are provided, these sleeves being welded to the dome and to the tubes. Thus the headers 16 and 17 are suspended from the roof of the dome.

Considering, now, a single one of the tubes 10 of the bundle, starting at the left-hand header 16 of Fig. 2, it will be seen that the inlet end of the tube is connected to the header 16, passes downwardly a short distance when the tube becomes bifurcated. The bifurcated portion of the tube then extends downwardly longitudinally of the cooling section to a point above the furnace section where both tubes of the bifurcated circuit are rebent upon themselves and pass upwardly, terminating at the top in another bifurcate and single tube which is connected to the adjacent upcomer header 17. Thus each tube has a downcoming pass and an upcoming pass, these passes being positioned closely adjacent one another. The next tube connects with the second downcomer header 16, passes downwardly and is rebent on itself as before described, after which it passes upwardly and has its upper end connected to the first upcomer header 17; and so on with all of the tubes comprising the bundle.

The downcomer tubes 18 connect at their upper ends with one or the other of the downcomer or feeder headers 21, as will further appear. The downcomer headers 21 are supplied by a feeder pipe or pipes 22, the same being detachably connected to the headers 21 at one end thereof, as indicated at 23. The pipe or pipes 22 are supplied from the strainer drum 24 which in turn is supplied by the pipe 25 connected to the discharge side of the forced circulation pump 26 which in turn is connected to the steam and water drum 30.

The upcomer tubes 19 are connected at their upper ends to one or the other of the delivery headers 27, as will further appear. Detachably coupled to each end of a header 27 are the headers 28 and 29. The headers 28 and 29 are connected to the steam and water drum 30 of the waste heat boiler by means of upcomer or delivery tubes 31 and 32.

Welded to the upper end of the casing 11 is the flange coupling member 33 and welded to the bottom end of the dome is a flanged coupling member 34, these members being hermetically secured together as by means of bolts 35 and gasket 36 or a seal weld which can be broken or cut.

From the foregoing it will be seen that the tube bundle, the drum, the headers 16 and 17, the tubes 18 and 19, the headers 21, and the headers 27, may be assembled and handled and installed or removed as a unit. In disassembly of the unit from the balance of the equipment, all that is necessary is to break the joint between dome and casing, the joint between dome and pipes 15, the joints 23 and the joints between the headers 27 and the headers 28 and 29. When this is done the unit may be withdrawn and the interior of the cooling section made accessible for inspection or repair and similarly with the dome and the parts associated therewith to form the unit.

It will be observed that the dome is substantially greater in height than the length of the headers 16 and 17 and that the dome is provided with a manhole 37. Thus should it be necessary at any time to remove and replace a header, this may be done by upending the header within the dome (after disconnecting the pipes and tubes connected to the particular header), whereupon the header may be withdrawn through the manhole and a new header introduced through the manhole and installed.

It is also to be observed from inspection of Fig. 3 that although the headers 16 and 17 are of varying length, each has a length in relation to the diameter of the bundle such that, in most instances, it is possible to connect the tubes 18 and 19, to their respective headers at a point outside the margin of the bundle, thus affording free access to the hand holes opposite the ends of the tubes of the bundle. In other cases, especially where the headers are of great length, it may be desirable to provide additional tubes 18 and 19, as the case may be, to supply and relieve the headers intermediate their ends, as indicated in Fig. 4. This however would present only a minimum interference with access to the hand holes of the headers since these intermediate tubes can generally be confined to outlet headers only. The dome diameter is sufficiently great to permit of inspection and working access to all parts therewithin.

From what has heretofore been said, it will be seen that the operating conditions of the generator are severe, which makes it desirable to have a minimum of openings in the casing. By arranging the dome and the bundle and the parts directly associated therewith as a unit, only one joint, i. e., the joint between the dome and the casing, is required.

In order to drain the headers 16 and 17 and tubes 18 and 19, when the installation is shut down and the circulation reversed, we provide a flexible drain pipe or pipes 39. Ordinarily only one is needed. This pipe has one end connected to one of the downcomer headers 16 and passes through the wall of the dome where it is provided with a sleeve 40, welded to the pipe and to the dome. At the other end the pipe 39 is detachably coupled to the pipe 41 which connects with the strainer drum 24. Hence pipes 41 and 39 act to supply water when the system is in operation and as a drain when it is not in operation and the drain cock 42 located at the pump or other low spot in the system is opened. No valves or ancillary equipment are thus required. The drain keeps clean by reason of the fact that it acts as a feed line.

The upper ends of the water wall tubes preferably extend only to the joint between drum and casing and preferably not substantially thereabove. The gases are cooled sufficiently at this point so that contact with the metal of the dome is not harmful, and also it is possible to handle the dome and its associated parts as a unit without danger of damage to the water wall tubes. Moreover, the cooling section and the furnace section, with the casing and the water walls, may also be assembled as a unit and handled as such without likelihood of injury.

In the installation shown, the dome has an inside diameter of 11 ft., from which the dimensions of the other parts may be readily visualized. The wall tubes are preferably 1¼" outside diameter, as are the tubes of the bundle. The waste heat boiler is preferably of the forced recirculation type. The waste heat boiler is provided with the customary feed water supply, not shown. It is obvious that the invention may be applicable to systems other than particularly described.

The burner opening being in the bottom of the furnace, any tube or tubes of the bundle which need to be replaced can be removed therethrough and a new one inserted without breaking the joint between dome and casing. To this end a pit (not shown) is located beneath the furnace. While we have shown a manhole in the dome, one of the gas outlets may be used as the manhole by breaking the joint between the dome and the respective gas pipe. Minor repairs may be made in the parts in the dome by access through such manhole.

We claim:

1. Apparatus for containing a high-pressure exothermic gas synthesis reaction and for extracting waste heat resulting therefrom, comprising a generally vertical metal pressure casing defining a high-temperature reaction section and a cooling section above the reaction section, water cooling means for said casing in said reaction and cooling sections, a unitary gas-collecting dome defining a low-temperature section, gas-tight joint means detachably securing the lower part of said dome to the upper part of said casing, and a bundle of boiler tubes freely extending from within said low-temperature section above said joint means into said cooling section, said tubes being suspended from said dome by direct mechanical interconnection between the dome and upper portions of tubes passing through the dome, header means positioned exteriorly of the dome, and connected to the tubes passing through the dome, and severable joint means connecting the header means last-named into the circulation of a waste-heat boiler.

2. Apparatus in accordance with claim 1 wherein the header means outside the dome include both downcomer and upcomer headers, connected to the dome to form a unit therewith, said apparatus further including downcomer and upcomer pipes connected by severable joint means with said headers and connecting the latter with said water cooling means.

3. Apparatus for containing a high-pressure exothermic gas synthesis reaction and for extracting waste heat resulting therefrom, comprising a generally vertical metal pressure casing adapted to withstand pressures of several atmospheres and defining a high-temperature reaction section and a cooling section above the reaction section, water-wall tubes for cooling said casing in said reaction and cooling sections, a unitary gas-collecting dome defining a low-temperature section above the cooling section, gas-tight joint means detachably securing the lower part of said dome to the cooling section end of said casing, a bundle of tubes freely depending within the gas cooling section, and means for suspending the bundle from the dome comprising header means in the dome with which the tubes of the bundle are connected, and boiler tubes connected to the header means and passing through the crown of the dome, said last-mentioned tubes being secured to the dome by gas-tight sealing means where they pass through the same.

4. Apparatus according to claim 3, having header means mounted above the dome and connected with the tubes last named, and pipe means incorporating a severable joint and connecting said header means into the circulation of a waste heat boiler.

5. Apparatus according to claim 4, wherein the headers within the dome comprise both downcomer and upcomer headers, and the headers exterior of the dome likewise comprise both downcomer and upcomer headers, and the tubes which pass through the crown of the dome comprise both downcomer and upcomer tubes, the ends of which are connected with corresponding downcomer and upcomer headers.

6. Apparatus for containing a high-pressure exothermic gas synthesis reaction and for extracting waste heat resulting therefrom, comprising a metallic gas-tight casing capable of withstanding pressures of several atmospheres, defining a reaction section and a cooling section above the reaction section; a gas-tight unitary dome capable of withstanding pressures of several atmospheres positioned above said cooling section and defining a gas-collecting section; gas-tight joint means interconnecting the upper end of the casing and the base of the dome; a plurality of boiler tubes passing through the crown of the dome and secured thereto by gas-tight sealing means; a plurality of headers connected to the lower ends of said tubes and suspended cross-wise of the dome above the level of the joint means; and a plurality of U-shaped cooling tubes connected to said headers and depending freely into the cooling section, said cooling tubes being connected to said headers in a region intermediate the ends of said headers, and said boiler tubes being connected to said headers outwardly of said cooling tube connections.

7. Apparatus according to claim 6, and further including manhole structure in the crown of said dome, said apparatus being characterized in that the vertical dimension of the dome is greater than the maximum length of any header within the dome and the cross-sectional dimension of the manhole is greater than the cross-sectional dimension of any such header.

8. Apparatus for containing a high-pressure exothermic gas synthesis reaction and for extracting waste heat resulting therefrom comprising a reaction section, a gas-cooling section and a casing for said sections having severable joint means at its upper end; a gas-collecting dome having severable joint means mating with the joint means carried by the casing and sealed thereto, and a waste heat boiler associated with the apparatus, said boiler including headers within said dome, a bundle of tubes connected with and supported by said headers and freely extending within the gas-cooling section, boiler tubes connected to and supporting said headers and extending through and secured to the wall of the dome, said tubes being connected outside said dome into the circulation of the boiler, and a drain pipe passing through and connected to the wall of the dome and connected at one end with a header in the dome and having a detachable connection at the other end with the boiler on the downcoming side thereof whereby said drain pipe serves as a feeder when the boiler is in operation.

9. Unitary superstructure for capping a vertical metal-jacketed reaction chamber and cooling tower, comprising a dome-shaped metal shell open at the base and incorporating at said base a severable joint element congruent with the tower jacket; a plurality of boiler tubes passing through the crown of said dome and welded thereto; headers outside of said dome to which said tubes connect; conduits from said headers, each terminating in a severable joint element;

headers within the dome connected to and supported by said boiler tubes; a gas delivery manifold communicating with the interior of said dome and incorporating a severable joint element outside of the dome; and cooling tubes connected to and supported by headers within the dome and extending through and beyond the mouth of the dome, said dome and its associated parts being handleable as a unit.

10. In a system for cooling a gas under pressure and thereby heating a vaporizing or other fluid, a heat exchanger comprising a cooling section having an inlet for the gases to be cooled and an outlet for the cooled gases, a cooled gas receiving section provided with a gas outlet, severable joint means coupling said receiving section to the outlet end of the cooling section, headers within said gas receiving section, a bundle of tubes connected with said headers and freely depending therefrom into said cooling section, fluid supply and fluid discharge tubes connected to the respective ends of said headers and passing through an upper wall of the receiving section and secured thereto, fluid supply and fluid discharge headers connected to the respective ends of said tubes outside of said receiving section, and detachable connections for said last-mentioned headers for connecting the same into the system.

11. In a system for cooling a gas under pressure and thereby heating a vaporizing or other fluid, a heat exchanger comprising a casing of gas and pressure tight construction built in two unitary sections, each having one member of a severable joint assembly, and each having fluid circulation means connecting with boiler elements outside the casing, and incorporating a severable joint, an inlet opening for hot gas in one section and an outlet opening for cooled gas in the other section, located at opposite ends of the exchanger, a lining for protecting the casing at the inlet end, the gas outlet section having a portion of its length of enlarged diameter, headers within the enlarged portion of the gas outlet section, a bundle of tubes connected with said headers and freely extending within the gas inlet section, circulation tubes connected to said headers extending through the wall of said gas outlet section and secured thereto, other headers located outside the gas outlet section with which said circulation tubes also connect, and detachable connections for said last outside headers for connecting the same into the system.

WARD S. PATTERSON.
WILBUR H. ARMACOST.

REFERENCES CITED

The following references are of record in the file of this patent:

UNITED STATES PATENTS

| Number | Name | Date |
|---|---|---|
| 1,794,802 | Spyer | Mar. 3, 1931 |
| 1,827,244 | La Mont | Oct. 13, 1931 |
| 1,874,527 | Herpen | Aug. 30, 1932 |
| 1,931,948 | Armacost | Oct. 24, 1933 |
| 2,007,540 | La Mont | July 9, 1935 |
| 2,013,985 | Kerr | Sept. 10, 1935 |
| 2,087,972 | Heller | July 27, 1940 |
| 2,213,052 | Rosencrants et al. | Aug. 27, 1940 |
| 2,258,467 | Owens | Oct. 7, 1941 |
| 2,267,027 | Hardgrove | Dec. 23, 1941 |
| 2,319,399 | Hamm | May 18, 1943 |
| 2,338,295 | Mekler | Jan. 4, 1944 |
| 2,416,462 | Wilcoxson | Feb. 25, 1947 |